United States Patent [19]

Klesse

[11] Patent Number: 5,583,760
[45] Date of Patent: Dec. 10, 1996

[54] SYSTEM FOR ESTABLISHING AND ADMINISTERING FUNDED AND POST-FUNDED CHARGE ACCOUNTS

[75] Inventor: Richard C. Klesse, Neshanic Station, N.J.

[73] Assignee: Beneficial Franchise Company, Inc., Wilmington, Del.

[21] Appl. No.: 285,076

[22] Filed: Aug. 3, 1994

Related U.S. Application Data

[63] Continuation of Ser. No. 887,089, May 22, 1992, abandoned.

[51] Int. Cl.$^6$ .............................. G06F 17/60; G06G 7/52
[52] U.S. Cl. ...................... 395/238; 395/202; 395/230
[58] Field of Search ................................. 235/379, 380; 364/401, 406, 408

[56] References Cited

U.S. PATENT DOCUMENTS

| | | | |
|---|---|---|---|
| 3,594,727 | 7/1971 | Braun | 340/152 |
| 4,270,042 | 5/1981 | Case | 235/379 |
| 4,319,336 | 3/1982 | Anderson et al. | 395/375 |
| 4,341,951 | 7/1982 | Benton | 235/379 |
| 4,727,243 | 2/1988 | Savar | 235/379 |
| 4,823,264 | 4/1989 | Denning | 364/408 |
| 4,858,121 | 8/1989 | Barber et al. | 364/406 |
| 4,947,027 | 8/1990 | Golightly | 235/448 |
| 4,948,174 | 8/1990 | Thomson et al. | 283/58 |
| 4,953,085 | 8/1990 | Atkins | 364/408 |
| 4,960,981 | 10/1990 | Benton et al. | 235/379 |
| 5,012,077 | 4/1991 | Takano | 235/380 |
| 5,070,452 | 12/1991 | Doyle, Jr. et al. | 364/401 |
| 5,121,945 | 6/1992 | Thomson et al. | 283/58 |
| 5,220,501 | 6/1993 | Lawlor et al. | 364/408 |
| 5,231,569 | 7/1993 | Myatt et al. | 364/408 |

OTHER PUBLICATIONS

Raphael; "Feeling Sick? Now You Can Get Better With a Credit Card"; *Crains Detroit Business*; v5 n50 s1; p18; Dec. 11, 1989; Dialog: File 635, Acc# 0118046.

Gonzales; "New Medical Financial Service Lets Patients Pay With 'Plastic'"; *Business Journal—Serving Phoenix & the Valley of the Sun*; v10 n47; p4(1); Oct. 1, 1990; Dialog: File 148, Acc# 04852648.

Freeman; "Two Hospitals Accept Medical Credit Card"; *Jacksonville Business Journal*; v6 n8; p10(1); Nov. 30, 1990; Dialog: File 148, Acc# 04915414.

"Credit card specilizes in health care", Arkansas Democrat Gazette, Feb. 21, 1992 by Blount.

*Primary Examiner*—Robert A. Weinhardt
*Assistant Examiner*—Stephen R. Tkacs
*Attorney, Agent, or Firm*—Robert D. Schaffer; Rogers & Wells

[57] ABSTRACT

A data processing system is disclosed that establishes and administers charge accounts, including both funded and post-funded accounts. In one embodiment, the system of the invention establishes charge accounts for all of the patients of a medical professional, with creditworthy patients having funded accounts, and patients who are not creditworthy having post-funded accounts. Each patient is issued a charge card which can be used to pay for medical services at participating providers. When a patient with a funded account charges medical services, the doctor is paid promptly and the servicing company proceeds to collect payment from the patient. For post-funded accounts, the doctor is not paid until funds are received from the patient.

9 Claims, 4 Drawing Sheets

SYSTEM FOR ESTABLISHING AND ADMINISTERING FUNDED AND POST-FUNDED CHARGE ACCOUNTS

This is a continuation of application Ser. No. 07/887,089, filed May 22, 1992.

FIELD OF THE INVENTION

This invention relates to a data processing system and, more specifically, to a system for establishing and administering charge accounts, including both funded and post-funded accounts.

BACKGROUND OF THE INVENTION

A variety of billing systems are currently used by professionals such as doctors and dentists to bill patients for professional services rendered. For example, many doctors handle billing and collections within their own office, typically employing a person to assist them in this capacity, or utilizing receptionists and/or medical assistants to perform billing and collection duties. Similarly, many hospitals and clinics employ accounting departments to perform billings and collections.

In order to relieve physicians, dentists and medical institutions, etc. (referred to generally herein as "providers") of the cost and difficulty associated with patient billing, a number of companies offer billing and collection services to the medical community (referred to generally herein as "servicing companies"). For example, one such servicing company issues a charge card to each of the patients of a provider, with the patients using the charge card to pay for medical services as the services are provided. The provider transmits the charge information to the company (e.g., electronically or by phone) and the servicing company sends a bill to the patient. Once the servicing company is paid by the patient, the company deducts its fee (usually a percentage of the total amount paid) and forwards the remainder of the funds to the provider.

One disadvantage to this type of charge card system is that the provider must wait for the patient to remit payment to the servicing company before any funds are paid to the provider. As a result, some providers prefer to use the services of servicing companies that create "funded" charge accounts. For funded charge accounts, the servicing company establishes a line of credit for each creditworthy patient and will immediately pay the provider for medical services provided to the patient up to the available credit line. The servicing company will then proceed to collect the funds from the patient. These credit card systems therefore are similar to traditional credit cards like Visa and Mastercard, and each patient must submit credit information and be approved for a credit line in order to be granted a funded charge card.

SUMMARY OF THE INVENTION

The present invention is a unique combination of data processing programs that overcomes the disadvantages of prior art systems by providing a data processing system which establishes and administers charge accounts, including both funded and post-funded accounts. The system of the invention will enable providers of services, such as medical doctors, to utilize a single charge card system for all of their patients, including those patients that are not creditworthy. Moreover, for those patients who are creditworthy, funded accounts are established to eliminate any delay in providing funds to the provider.

In one preferred embodiment, the invention includes: a data processor for processing data in accordance with stored program instructions; a first memory connected to the data processor for storing program instructions; a second memory connected to the data processor for storing credit criteria data; an input means for inputting credit data, charge data and payment data to the data processor; a third memory connected to the data processor for storing credit account files; program instructions stored in the first memory means for causing the data processor to compare the input credit data to the stored credit criteria data and generating outputs to the third memory means to create either (i) a funded credit account file having a unique identification label, or (ii) a post-funded credit account file having a unique identification label; program instructions stored in the first memory means for causing the data processor to debit inputted charge data from a uniquely identified credit account file; program instructions stored in the first memory means for causing the data processor to credit a uniquely identified credit account file in response to inputted payment data; electronic funds transfer means connected to the data processor for transferring funds between two financial accounts; program instructions stored in the first memory means for causing the electronic funds transfer means to electronically transfer funds charged to a funded charge account file for distribution in accordance with inputted charge data; and program instructions stored in the first memory means for causing the electronic funds transfer means to electronically transfer funds charged to a post-funded charge account file upon receipt of payment data credited to the post-funded credit account file.

A preferred embodiment of the invention further includes program instructions stored in the first memory for deducting a predetermined amount from inputted payment data and crediting the remainder to a uniquely identified credit account file. Each account file created in the third memory includes a charge limit representing the maximum amount which may be charged to each account. The system also includes program instructions stored in the first memory for causing the data processor to generate outputs to the third memory creating a hybrid charge account file having a unique identification label, the hybrid account file having a charge limit and a credit limit that is less than the charge limit. Each hybrid account file is characterized by an account balance that is equal to the sum of all debits charged to the account file less the sum of all payments credited to the account, and each hybrid account comprises a funded portion for that portion of the account balance that is below the credit limit and a post-funded portion for that portion of the account balance that is above the credit limit.

The present invention enables a servicing company to assume the billing responsibilities for all of the patients of a provider, without regard to their individual creditworthiness, and without delaying payment to providers for creditworthy patients. The result is a comprehensive charge card system that combines the benefits of funded and post-funded account systems into a single comprehensive billing and collections system.

DETAILED DESCRIPTION OF A PREFERRED EMBODIMENT

Figure 1:
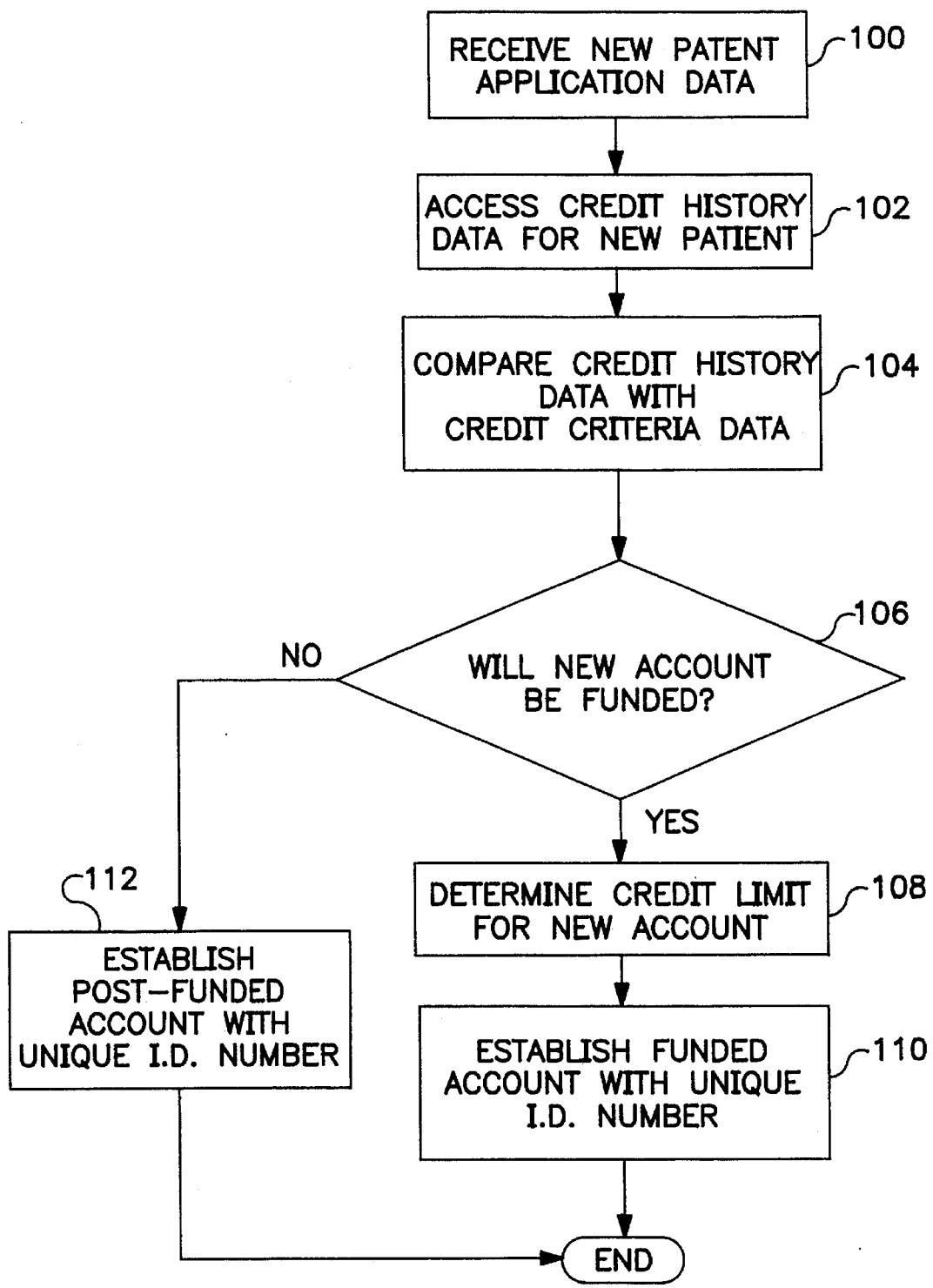
FIGS. 1–4 are flow diagrams illustrating the processing function for establishing and administering charge accounts according to the present invention.

Referring to FIGS. 1–4, there is shown in schematic flow diagram form the data processing functions carried out by the present invention and implemented using a data processing system. A physician, dentist or other provider of professional services ("provider") establishes an account for a new patient by providing application data to the system (step 100). The data includes the patient's name, address, telephone number, insurance carrier (if any) and whether the account is a single or joint account. The information is collected from the patient, typically by having the patient fill out a form, and is then transmitted electronically from the provider to the servicing company.

The system then accesses credit history information concerning the patient from a national credit bureau (step 102), and compares the credit history data with predetermined credit criteria data to determine the creditworthiness of the new patient (step 104). Systems that perform this type of creditworthiness determination are commercially available. For example, Beneficial National Bank USA of Wilmington, DE, provides a service to customers under the Trademark SNAP® that accesses credit bureau information and analyzes the information to determine the creditworthiness of an individual. The credit criteria data includes such information as minimum income requirements, age, home telephone number, and country of residency.

Based on the results of the comparison of the credit history of the patient and the credit criteria data, a decision is made whether to create a funded or post-funded account (step 106). As will be described in more detail below, a funded account is an account for which payment is made to the provider by the servicing company before the servicing company collects from the patient. A post-funded account is an account for which payment is made to the provider only upon receipt of payment from the patient.

For funded accounts, a determination is made as to the credit limit to be assigned to the new account. The credit limit is the minimum amount that the servicing company will forward to the provider prior to receiving a payment from the new patient. This credit limit represents the maximum risk that the servicing company is willing to assume for each patient. The specific dollar value of the credit limit is established based on the results of the comparison of step 104, and a funded account file is established with the credit limit and a unique identification number (step 110). If the system decides, as a result of the comparison in step 104, that the patient is not creditworthy, the new account will be a post-funded account, and a post-funded account file is established, also with a unique identification number (step 112). Both funded and post-funded accounts have a charge limit which limits the total amount of medical services that can be charged on the charge card.

Once the account is established, a credit card bearing the account number is generated and sent to the patient. The patient may present this card to any participating provider to pay for medical services. In order to ensure that a presented card is a valid card, the provider will contact the servicing company for an authorization number using a conventional authorization terminal that communicates directly with the servicing company's computer system. Alternatively, a provider can obtain the authorization number by telephone.

Figure 2:
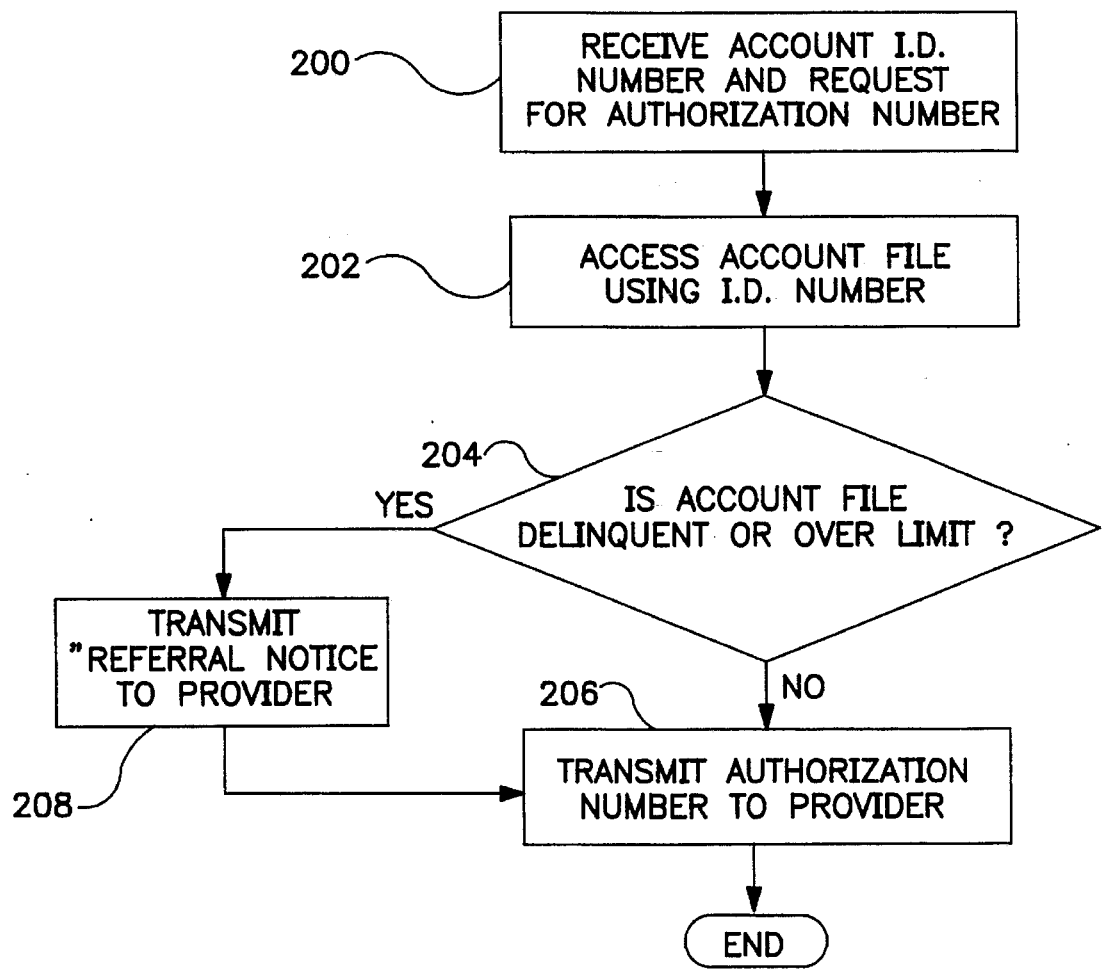

Referring to FIG. 2, the system will receive the request for an authorization number along with the account I.D. number (step 200) and will access the patient file (step 202). The system will then analyze the account history to determine if the account is either delinquent or over the charge limit (step 204). If the account is not delinquent or over the limit an authorization number is transmitted to the provider. (Step 206). If the account is delinquent or over the limit, a "Referral" notice is transmitted to the provider (step 208). The provider must then telephone the servicing company for an authorization number. At this time the authorization number is provided by an operator, and the provider is informed of the account status. The servicing company's actions concerning overdue and delinquent accounts are discussed in more detail below.

Figure 3:
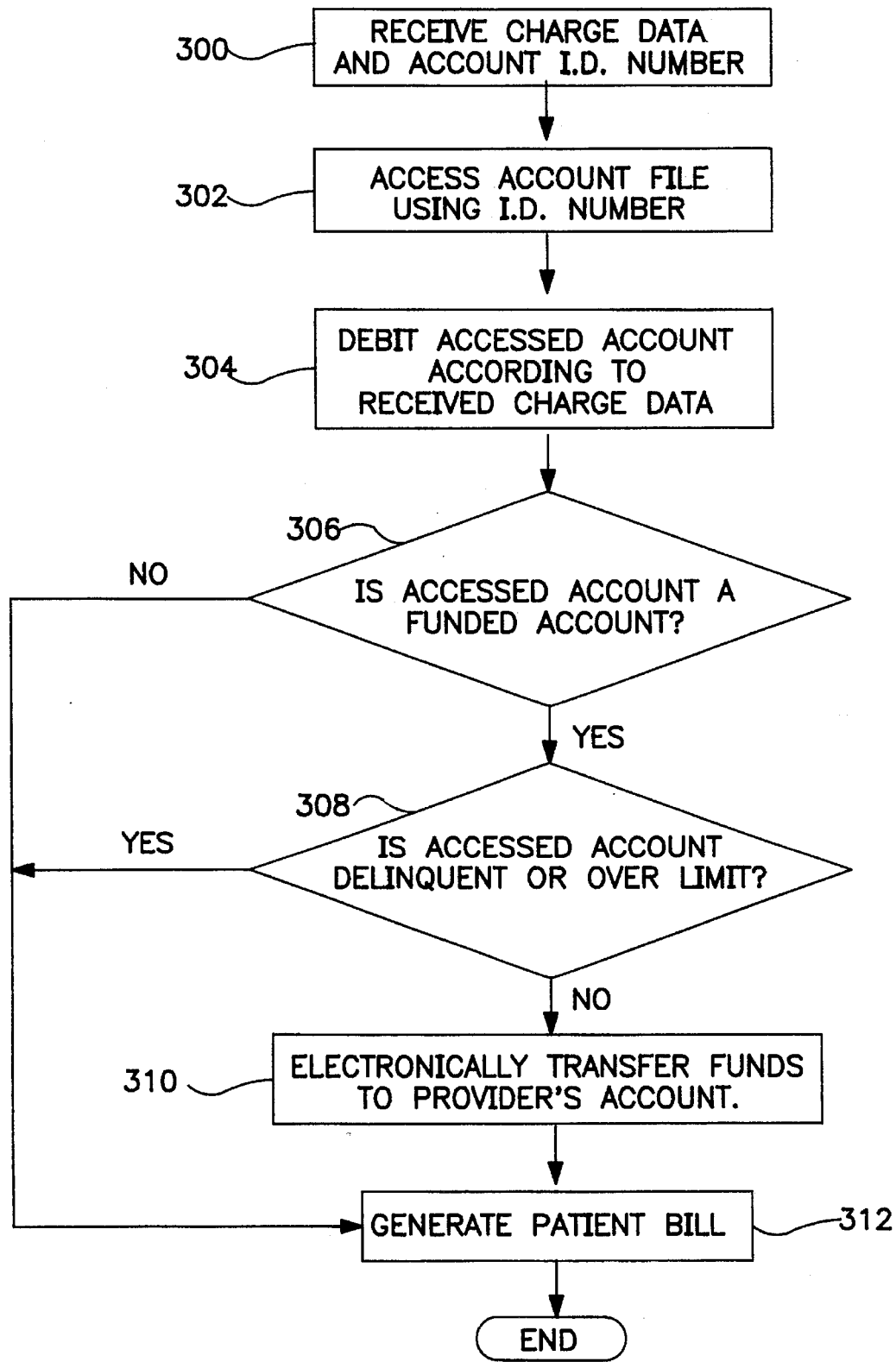

Referring to FIG. 3, after the authorization of a new charge, the provider transmits charge data (i.e., the amount of the new charge) to the system along with the account I.D. number corresponding to the new charge (step 300). The system uses the I.D. number to access the proper account file (step 302) and debits the file in accordance with the received charge data (step 304). In other words, the system adds a debit to the patient's account for the total amount of the services being provided. For example, if the patient had a zero balance and has just had a medical treatment totalling $500.00, the account balance increases to $500. The patient is later billed for this amount by the servicing company, as described below.

If the debited file is a funded account (step 306) and if it is not delinquent or over the authorized limit (step 308), funds are electronically transferred to the provider's account from an account under the control of the servicing company (step 310). The amount transferred will be equal to the amount of the charge, less any fees to be paid to the servicing company. An appropriate bill is then generated and sent to the patient (step 312).

If the debited file is not a funded account (i.e., if it is post-funded) (step 306), then funds are not transferred to the provider and a patient bill is generated (step 312). The provider is paid after the funds have been received from the patient, as described below. Similarly, if the account is over the limit or is delinquent, funds are not released to the provider at this time (step 308).

Figure 4:
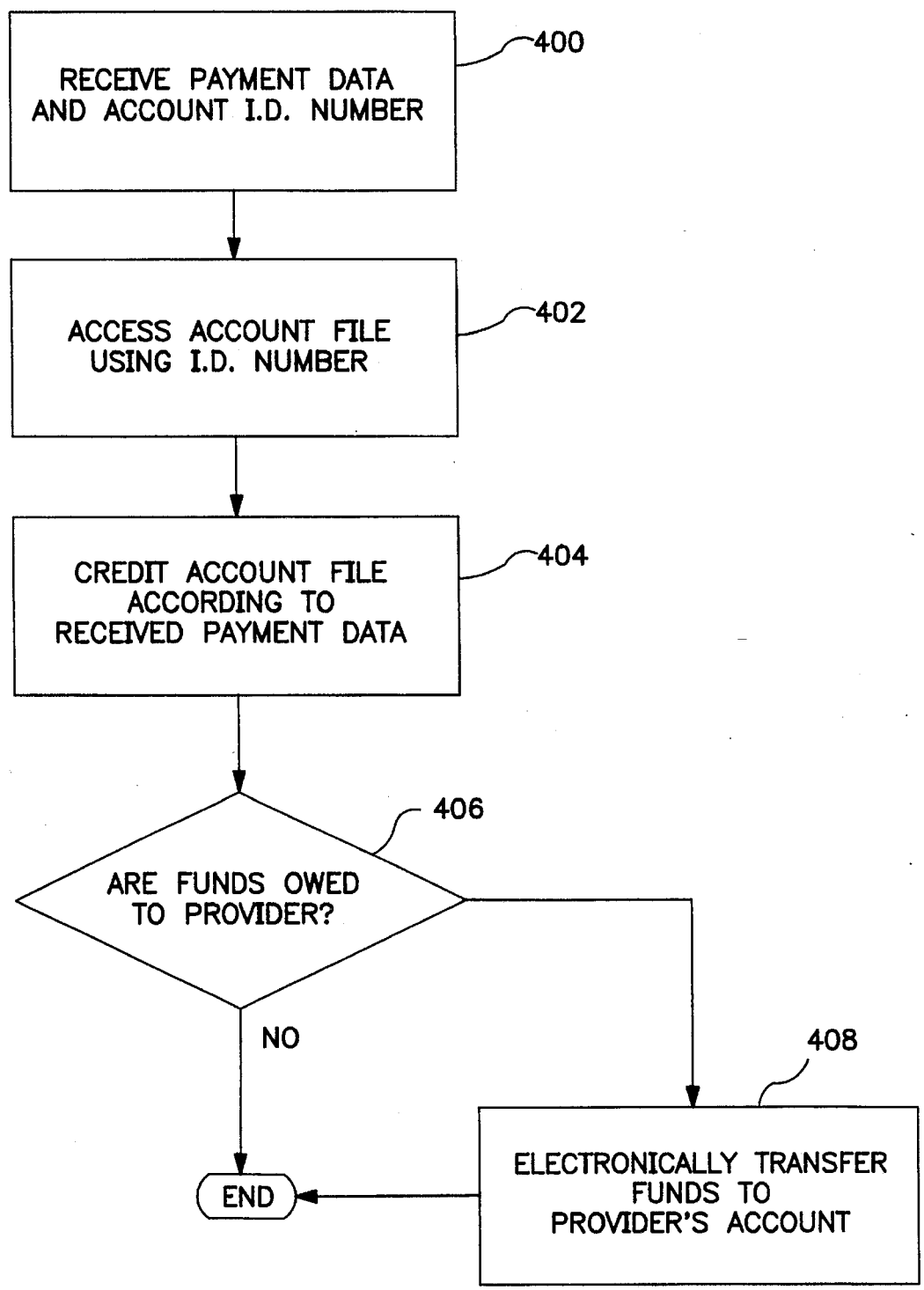

Referring to FIG. 4, when a payment is received from a patient, the payment data (i.e., the amount of the payment) and account I.D. number are entered into the system (step 400). The system will access the patient file using the I.D. number (step 402) and credit the patient file with the appropriate amount (step 404). If the account is post-funded, over its limit, or was delinquent, funds will be owed to the provider (step 406), and the funds are electronically transferred to the provider's account less any monies to be retained by the servicing company. If the account is funded, the provider would have already been paid and no further action by the servicing company is necessary.

For both funded and post-funded accounts, a maximum charge limit may be set such as, for example, $5,000. In other words, patients will not be permitted to bill more than $5,000 to their charge card, in order to limit the total risk assumed by the providers. As noted above, the risk assumed by the servicing company is limited to the credit limit for funded accounts. For those funded accounts where the creditworthiness of the patient results in a credit limit of less than $5,000, a hybrid funded/post-funded account is established. The hybrid account is treated as a funded account for charges up to the credit limit, and as a post-funded account for the charges above the credit limit and less than the charge limit. As an example, consider a patient whose credit limit is established at $3,000 and whose charge limit is $5,000 (the same charge limit as post-funded accounts). For charges up to the $3,000 limit, the account is treated as a funded account and the provider is paid promptly upon receipt of the charge data (see step 310). However, for any charges that exceed the $3,000 limit, the account is treated as postfunded and the provider is paid only after payment has been received from the patient (see steps 306 and 408).

The apparatus used to implement the procedures described in detail above are conventional computer processors and peripheral hardware, and are well known to those skilled in the art. For example, the various data functions are carried out using conventional data input apparatus such as a personal computer having data processing capabilities, a visual monitor, keyboard, data storage and data retrieval capabilities. The data processing functions described in detail above are implemented using a conventional computer system, such as an IBM System 38. The systems used to communicate information between the providers and the servicing company are similarly conventional systems used widely with credit card charge systems.

The preceding description is for illustrative purposes only and other embodiments are within the scope of the appended claims. For example, although the invention has been described in the context of a medical provider, the system can be used to facilitate billing and collections for any business or individual that needs such services. Also, certain functions that are carried out automatically in the preferred embodiment described above may be carried out manually in other embodiments. As an example, funds may be paid to the provider by check as opposed to the electronic transfer described above. Other variations will be apparent to those skilled in the art.

I claim:

1. A system for automatically establishing, granting credit, and directing charge account transactions for allowing a user to receive goods or services regardless of credit worthiness comprising:

a. data processor for processing data in accordance with stored program instructions, wherein said data processor has a comparing means;

b. first memory means connected to said data processor for storing program instructions;

c. second memory means connected to said data processor for storing credit criteria data;

d. input means for inputting credit data, charge data and payment data to said data processor;

e. third memory means connected to said data processor for storing credit account files;

f. program instructions stored in said first memory means for causing said data processor to compare said input credit data to said stored credit criteria data and to generate outputs to said third memory means to create one of the following, either:

i. a funded credit account file having a unique identification label, or ii. a post-funded credit account file having a unique identification label; or iii. a hybrid credit account file having a unique identification label, wherein said hybrid account file has a charge limit and a credit limit that is less than said charge limit;

g. means for causing said data processor to input charge data from a uniquely identified credit account file;

h. means for causing said data processor to credit a uniquely identified credit account file in response to inputted payment data;

i. electronic funds transfer means connected to said data processor for transferring funds between two financial accounts as directed by said program instructions in said first memory means;

j. means for causing said electronic funds transfer means to electronically transfer funds charged to a funded credit account file for distribution in accordance with inputted charge data;

k. means for causing said electronic funds transfer means to electronically transfer funds charged to a post-funded credit account file upon receipt by payment data credited to said post-funded credit account file; and l. means for causing said electronic funds transfer means to electronically transfer funds charged to a hybrid credit account file in accordance with inputted charge data.

2. The system of claim 1 further comprising program instructions stored in said first memory for deducting a predetermined amount from inputted payment data and crediting the remainder to a uniquely identified credit account file.

3. The system of claim 1 wherein each said account file created in said third memory means include a charge limit representing the maximum amount charged to each account.

4. The system of claim 1 wherein each said hybrid account file is characterized by an account balance that is equal to the sum of all debits charged to each said account less the sum of all payments credited to each said account, and wherein each said hybrid account comprises a funded portion representing the account balance that is below said credit limit and a post-funded portion, representing the account balance that is above said credit limit.

5. In a data processing system for automatically establishing and administering charge account files, comprising:

a. means for comparing credit application data to predetermined credit criteria data and creating one of the following either:

i. a funded credit account file having a unique identification label;

ii. a post-funded credit account file having a unique identification label;

iii. a hybrid credit account file having a unique identification label, wherein said hybrid account file has a charge limit and a credit limit that is less than said charge limit;

b. means for receiving charge data and debiting a uniquely identified charge account file from said comparing means;

c. means for receiving payment data and crediting a uniquely identified charge account file from said comparing means;

d. means for electronically transferring funds for distribution in accordance with said charge data charged to said funded credit account files;

e. means for electronically transferring funds for distribution in accordance with said charge data charged to said postfunded credit account files, only upon crediting of payment data to said files; and f. means for electronically transferring funds for distribution in accordance with said charge data charged to said hybrid credit account file.

6. The system of claim 5 further comprising program instructions stored in said first memory for deducting a predetermined amount from inputted payment data and crediting the remainder to a uniquely identified credit account file.

7. The system of claim 5 wherein each said account file created in said third memory means includes a charge limit representing the maximum amount which may be charged to each account.

8. The system of claim 5 wherein each said hybrid account file is characterized by an account balance that is equal to the sum of all debits charged to each said account less the sum of all payments credited to each said account, and wherein each said hybrid account comprises a funded portion representing the account balance that is below said credit limit and a post-funded portion representing the account balance that is above said credit limit.

9. A system for establishing charge accounts comprising:

a data processor for processing data in accordance with stored program instructions, wherein said data processor has a comparing means;

b. first memory means connected to said data processor for storing program instructions;

c. second memory means connected to said data processor for storing credit criteria data;

d. input means for inputting credit data to said data processor;

e. third memory means connected to said data processor for storing credit account files;

f. program instructions stored in said first memory means for causing said data processor means to compare said input credit data to said stored credit criteria data and to generate outputs to said third memory means to create one of the following, either:

i. a funded credit acount file having a unique identification label if the comparison indicates that the user is creditworthy, ii. a post-funded credit account file having a unique idenfication label if the comparison indicates that the user is not creditworthy, or iii. a hybrid credit account file having a unique idenfication label, wherein said hybrid account file has a charge limit and a credit limit that is less than said charge limit if the comparison indicates that the creditworthiness of the user results in a credit limit which is less than a predetermined threshold.

* * * * *